Dec. 16, 1952  D. W. ROSENBERG  2,621,457
STALK SHREDDER AND DISINTEGRATOR
Filed April 1, 1948  2 SHEETS—SHEET 1
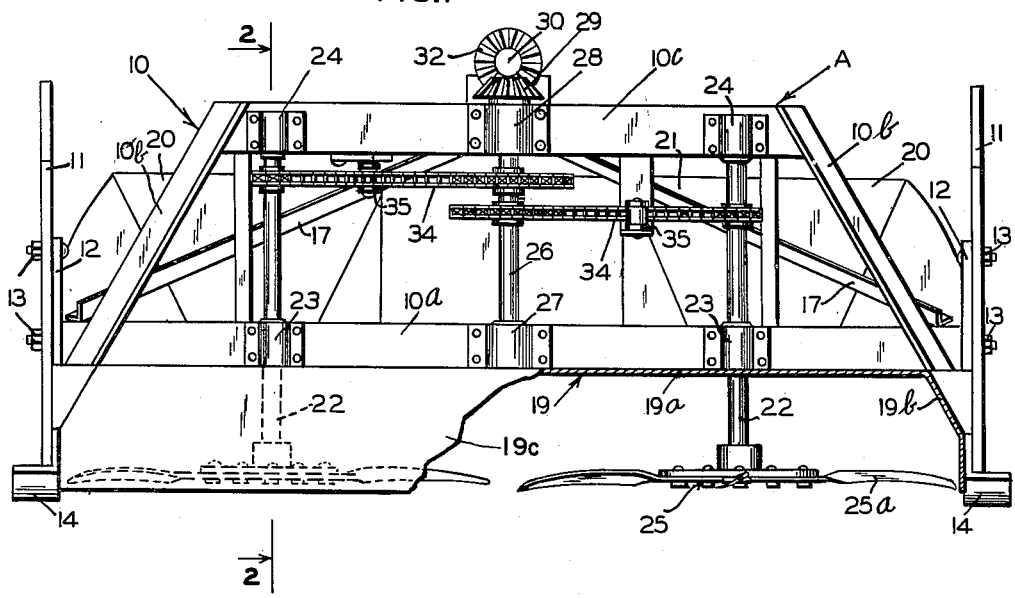
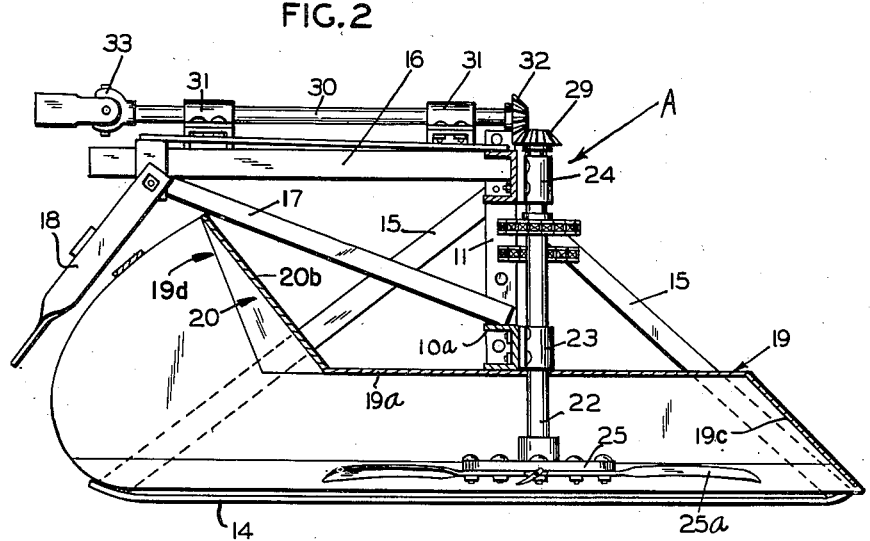
INVENTOR
DEWEY W. ROSENBERG
BY Williamson & Williamson
ATTORNEYS Dec. 16, 1952      D. W. ROSENBERG      2,621,457
STALK SHREDDER AND DISINTEGRATOR
Filed April 1, 1948      2 SHEETS—SHEET 2
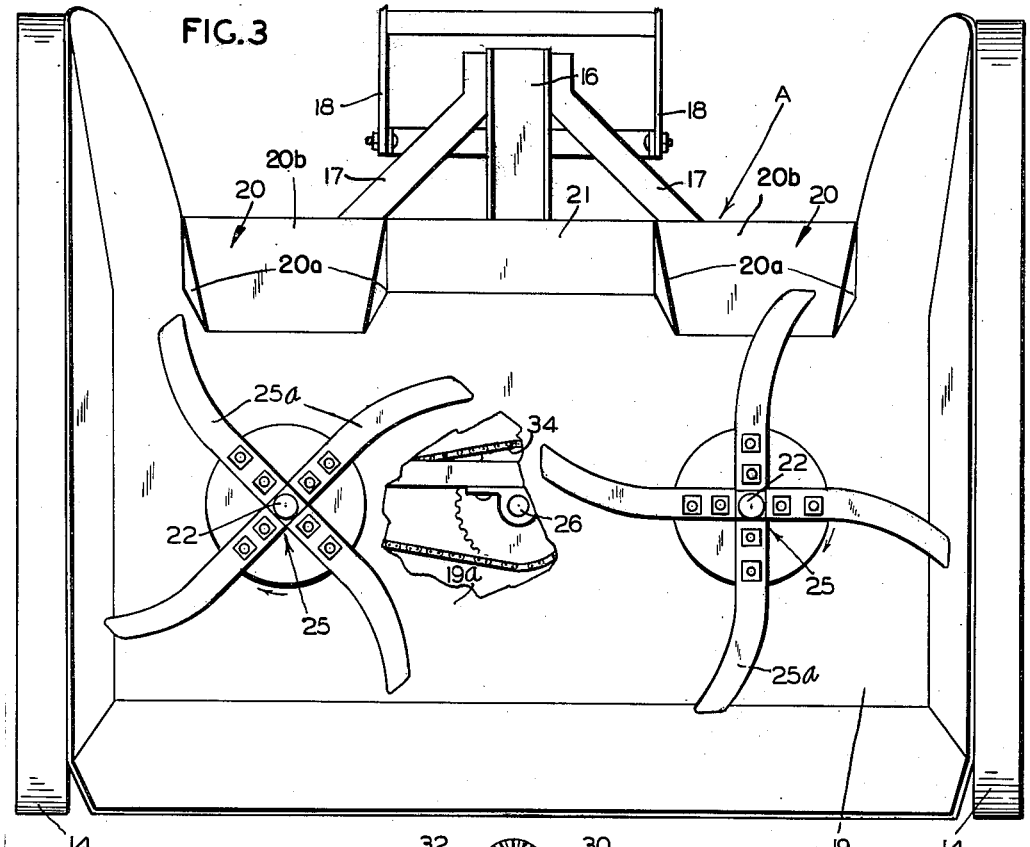
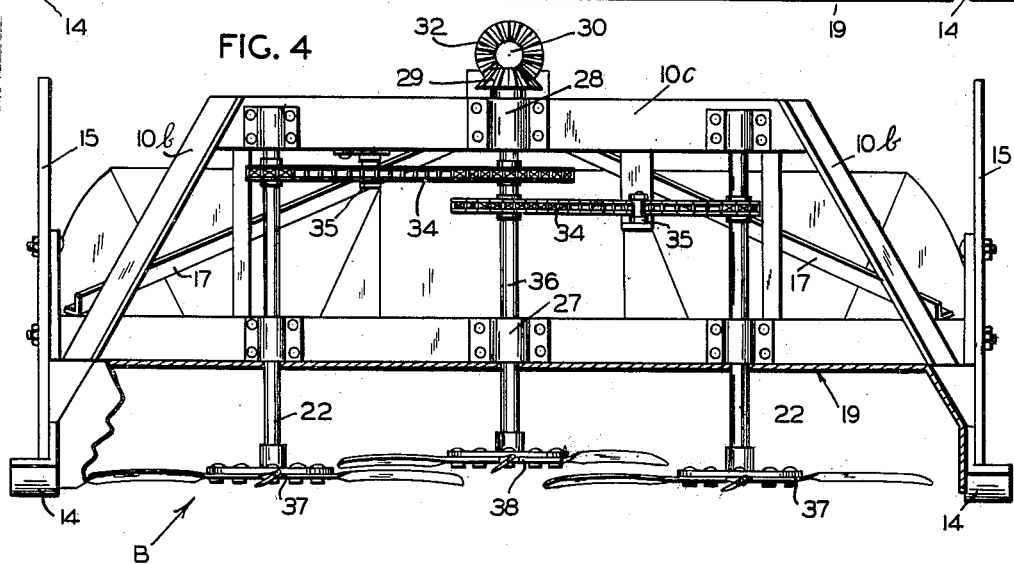
INVENTOR
DEWEY W. ROSENBERG
BY Williamson + Williamson
ATTORNEYS Patented Dec. 16, 1952

2,621,457

UNITED STATES PATENT OFFICE 2,621,457

STALK SHREDDER AND DISINTEGRATOR

Dewey W. Rosenberg, Welcome, Minn., assignor of one-third to Edwin H. Meyer, Fairmount, Minn.

Application April 1, 1948, Serial No. 18,463

1 Claim. (Cl. 55—62)

This invention relates to a machine for pulverizing stalks and crop residue remaining in the field after a harvest.

When crops such as corn and the like have been harvested fibrous stalks and residue are left in the field.

This material attracts weevils and other insects which infest the stalks and breed therein causing considerable damage to the subsequent year's crop. This has been a serious problem with farmers who grow corn and other crops which have fibrous stalks and residue attractive to these insects.

It is an object of my invention to provide a novel and improved extremely simple stalk pulverizer and shredder which is adapted to efficiently and completely pulverize the stalks and other residue left in the fields after a crop has been harvested. It is another object to provide a machine having at least one rotary cutter adapted to be driven at a high speed to shred and pulverize the stalks in the field after the harvest of a crop.

More specifically, it is an object of my invention to provide a stalk pulverizer and shredder horizontally mounted on a vertical rotary axis to initially shred the stalks longitudinally and thereafter pulverize the same to prevent any large fibrous units required by weevils and other insects from remaining on the field.

It is still a further object to provide a novel and improved cutter shredder mechanism mounted for rotary operation under a confining shield and adapted to draw the stalks and other fibrous residue thereunder to be pulverized within the disintegrating chamber formed thereby and discharged after complete shredding comminution.

These and other objects and advantages of my invention will more fully appear from the following description made in connection with the accompanying drawings wherein like reference characters refer to the same or similar parts throughout the views and in which:

Fig. 1 is a rear elevational view of my stalk pulverizer and shredder showing one form thereof and having a portion of the rear of the cover shield cut away;

Fig. 2 is a transverse vertical sectional view taken substantially along the line 2—2 of Fig. 1;

Fig. 3 is a bottom plan view of the machine shown in Figures 1 and 2 with a portion of the top of the cover shield cut away; and Fig. 4 is a rear elevational view of an alternative form of my invention with the rear of the cover shield cut away.

As illustrated in Figs. 1 through 3, I provide one form of my invention designated by the letter A having a supporting structure with the main transverse truss frame 10 which has a bottom transverse cross member 10a and diagonal members 10b fixed to said cross member 10a and converging angularly upwardly therefrom. An upper cross member 10c extends between the upper extremities of said diagonal members 10b and is fixed thereto to form a rigid truss with main cross member 10a and the two diagonals 10b. A pair of uprights 11 are connected at the end extremities of said main cross member 10a and are adjustably attached to bracket members 12 for vertical adjustment thereon. The bracket members 12 are fixed as by welding to the ends of cross member 10a. The uprights 11 have a plurality of vertically spaced apertures therethrough adapted to selectively receive the attachment bolts 13, which extend through suitable apertures in the brackets 12 to rigidly attach said uprights 11 to said brackets 12 while at the same time permitting vertical adjustment of said uprights. A pair of horizontal skids or runners 14 are fixed at the bottom of said uprights and are disposed longitudinally in spaced parallel relation to carry the machine as it travels over the ground surface. A pair of diagonal braces 15, best shown in Fig. 2, interconnect the respective forward and rear ends of said runners 14 with the upper portions of the respective uprights 11.

A center longitudinally disposed channel member 16 extends forwardly from the center of upper truss member 10c and a pair of diagonal struts 17 rigidly support the forward portion thereof. Suitable means for attaching the longitudinal channel 16 to a tractor are provided such as the pair of attachment bars 18 as shown in Figs. 2 and 3.

The cover shield designated as an entirety by the numeral 19 having a substantially rectangular horizontal top panel 19a is rigidly fixed to said cross member 10a as best shown in Figs. 1 and 2, and extends forwardly and rearwardly thereof and traverses the width of the machine. The forward marginal edge 19d of said cover shield 19 has, in the form shown, a pair of upwardly and outwardly flared scoops or chutes 20 having rearwardly converging sides 20a and an inclined top panel 20b which are adapted to initially receive and guide the stalks down under said shield top panel 19a. The two outwardly diverging scoops or chutes 20 are transversely spaced to permit their alignment with a pair of adjacent crop rows so as to successively receive the respective stalks in the rows as the machine is moved across the field longitudinally of said stalk rows. A central guiding plate 21 traverses the space between the two chutes 20 and extends angularly upwardly to guide any intermediate stalks or other material downwardly under the cover plate of shield 19. The shield 19 has side aprons 19b and a rear apron 19c which terminate at their bottoms slightly above the surface of the ground, the rear apron 19c being disposed at an obtuse angle relative to plate 19a. The clearance between the ground and these aprons 19b and 19c is adjustable by varying the position of uprights 11 on brackets 12. The upwardly flared forward guiding portions 20 and 21 are securely braced by being fixed to the diagonals 17, as best shown in Fig. 2.

A pair of vertically disposed rotary shafts 22 best shown in Fig. 1 are respectively mounted for rotation in bearings 23 and 24. It will be seen that each shaft 22 has a pair of suitable bearings 23 and 24 fixed respectively to vertically spaced cross members 10a and 10c. The bearings 23 and 24 are designed to prevent vertical shifting of the shafts 22 to permit the elevation of the lower extremities thereof to be varied relative to the ground surface. A pair of cutters 25 are respectively fixed in horizontally disposed position onto the lower extremities of said shafts 22 for rotation therewith. Each of the cutters in the form shown has four cutter blades 25a but the number of blades is in no way essential to the operation of my machine. The direction of rotation of the cutters 25 is indicated by arrows in Fig. 3 and the blades 25a are curved forwardly at the outer portions thereof so that said outer portions are respectively disposed ahead of the inner portions during their rotation. Also the blades 25a are pitched so that the trailing edges thereof are respectively vertically displaced and the surfaces of the blades slope upwardly from the leading edges thereof to the trailing edges. The pitch of the blades aids in producing a suction which draws stalks and other material up into contact with the blades and retains the shredded stalks under the shield 19 to permit the same to be completely pulverized. Flat blades without any pitch would produce a substantial vacuum under the shield 19 but having the pitched blades substantially increases this vacuum.

In the form shown in Figs. 1 through 3 a central vertically disposed rotary drive shaft 26 is journaled in suitable bearings 27 and 28 respectively mounted on the cross bars 10a and 10c midway between said shafts 22, said central drive shaft 26 being parallel with shafts 22. The bearings 27 and 28 are designed to prevent vertical displacement of shaft 26. Such shaft extends upwardly a slight distance above the upper bearing 28 and has a bevel gear 29 fixed to the upwardly extended portion, as best shown in Fig. 2. A horizontally disposed rotary connection shaft 30 is journaled in a pair of suitable bearings 31 which are mounted on horizontal channel 16. The connection shaft 30 has a bevel gear fixed to the rear extremity thereof and is adapted to intermesh with bevel gear 29 for driving the same. The horizontal shaft 30 extends forwardly along the channel 16 and has a universal joint 33 fixed at the forward end thereof. The said shaft 30 is adapted to be connected with a source of rotary power such as the power take-off of a tractor (not shown), said power being transmitted through said universal joint 33. As best shown in Fig. 1, the vertical, driven shafts 22 are rotated by suitable chain and sprocket driving connections 34 and have the resilient chain tightener rollers 35 engaged therewith. It will be seen that the two shafts 22 are both rotated in the same direction by the chain drive mechanisms 34.

The following is a description of the operation of form A of my invention. The draw-bar attachments 18 are connected with a tractor (not shown) and the power take-off connection through universal joint 33 to horizontal drive shaft 30 is made with the power take-off of the tractor (not shown) and the mechanism is drawn out into a field such as a corn field from which the corn has been harvested, leaving the stalks in the field some standing and some bent over and lying flat on the ground. The height of the cutters 25 and the cover shield 19 is initially adjusted to the optimum clearance above the ground surface and thereafter the machine is moved across the field preferably in longitudinal alignment with the rows of stalks. The cutters 25 are driven at relatively high speeds ranging from 1000 to 2000 R. P. M. In form A of the invention the blades 25a of both the cutters 25 are rotated in substantially the same horizontal plane and the ends of the blades of one cutter are slightly spaced from the ends of the blades of the other cutter at their closest position during their rotation. As the device moves along the rows, the standing stalks are bent forwardly by the flared chutes 20 and guide 21 and thus guided rearwardly under the horizontal top cover 19a of shield 19. With the blades travelling at such high speeds the stalks confined under the cover shield are immediately shredded upon contact with the outer portions of said blades. These shredded fragments may still be relatively large and if so are carried over to the other cutter and further pulverized by impact with the cutter blades and by being thrown against the aprons of the shield 19. The curved leading edges of the blades aid in slicing the fragments to shred the same. The action of the cutters travelling at high speed is to produce a vacuum within the shield 19 which tends to hold the particles under the shield until they are finely pulverized. The horizontal paths of the cutters 25 initially shred the stalks longitudinally and thereafter slice them transversely as well as longitudinally during the period when the fragments are retained under the shield 19. The vacuum produced by the rotation of the cutters 25 also lifts any stalks which have been flattened against the ground and will pulverize substantially all of these stalks as well as the standing stalks which have been bent down by the guides at the front of the cover. By horizontally rotating the cutters 25 it makes very little difference at what point the stalks enter under the shield 19 because substantially the entire area under the shield is covered by the rotation of the blades 25a and thus all of the stalks included between the runners 14 are disintegrated.

Form B of my invention is illustrated in Fig. 4 and is essentially the same as form A. The adjustable runners, frame members, bearings and power take-off connections all being identically similar with form A. The drive shaft 30 drives a central vertical shaft 36 mounted in bearings 27 and 28 and drives rotary shafts 22 through chain and sprocket driving connections 34 with tighteners 35. The shaft 36 extends downwardly below the lower bearing 27 and has a third cutter 38 fixed at the lower extremity thereof. The cutters fixed to shaft 22 are of slightly smaller diameter than the cutters 25 and are designated by the numeral 37. The central cutter 38 in the form shown in Fig. 4 is disposed slightly above the cutters 37 and is disposed centrally therebetween, the blades thereof overlapping the blades of cutters 37. This cutter 38 could be disposed below the cutters 37 as well as above them. It will be seen that all three cutters 37 and 38 are rotated in the same direction and by providing a third cutter greater cutting efficiency and shearing action on the stalks is obtained, as the machine is progressively moved across a field. In form A of the invention illustrated the axes of rotation of the cutters 25 are transversely spaced apart the distance between the rows of the stalks being disintegrated and said axes of rotation are aligned with the horizontal center lines of chutes 20. In form B of my invention the rotary cutter 38 may be aligned with one row and the cutters 37 aligned with the respective rows on either side of said first mentioned row and adjacent thereto, thereby disintegrating the stalks in three rows simultaneously.

It will be seen that I have provided a highly efficient mechanism for shredding and disintegrating fibrous stalks such as corn stalks left in the field after the crop has been harvested. There are several distinct advantages of my machine in that it tends to draw the stalks lying horizontally in the field upwardly into the cutter blades and that it has an extremely wide effective path as it progresses across a field. The blades of the cutters in either the two cutter or the three cutter form of the invention traverse substantially the entire width of the cover to provide for all the stalks passed over by the mechanism to be shredded and pulverized. The extreme strength and simplicity of my improved mechanism are also distinct advantages in the production of the machine.

It will, of course, be understood that various changes may be made in the form, arrangement and proportion of the parts without departing from the scope of my invention.

What I claim is:

A stalk shredder and disintegrator for row crops comprising a supporting structure, ground engaging elements mounted thereunder to permit said structure to be moved over the ground, a cutter enclosing shield mounted on said structure and including a horizontally disposed plate spaced above the ground surface and an enclosing apron extending downwardly at the sides and rear edge portions of said plate, the rear downwardly extending portion of said apron being disposed at an obtuse angle relative to said plate, a rotary cutter mounted on said structure for rotation on a substantially vertically disposed axis, and including a plurality of horizontally disposed blades positioned under said shield, the entire forward marginal edge portion of said shield being flared upwardly and having a stalk bending and guiding scoop with rearwardly converging sides and an inclined top panel disposed in an obtuse angular relation to said upwardly flared portion disposed at a lesser angle relative to the top plate of said shield than the upwardly flared forward portion thereof to gather and bend the stalks disposed in rows and deliver the same to the rotary cutter blades.

DEWEY W. ROSENBERG.

REFERENCES CITED

The following references are of record in the file of this patent:

UNITED STATES PATENTS

| Number | Name | Date |
| --- | --- | --- |
| 2,114,096 | Noel | Apr. 12, 1938 |
| 2,243,133 | Steiner et al. | May 27, 1941 |
| 2,308,076 | Hainke | Jan. 12, 1943 |
| 2,491,544 | Arkenberg | Dec. 20, 1949 |